(12) United States Patent
Lee

(10) Patent No.: US 6,295,565 B1
(45) Date of Patent: Sep. 25, 2001

(54) RAID CONTROLLER CARD COUPLED VIA FIRST AND SECOND EDGE CONNECTORS TO THE SYSTEM BUS AND ON-BOARD SCSI CONTROLLER RESPECTFULLY

(75) Inventor: Joon Lee, Yongin (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/198,399

(22) Filed: Nov. 24, 1998

(30) Foreign Application Priority Data

Nov. 24, 1997 (KR) .................................................. 97-62324

(51) Int. Cl.⁷ ...................................................... G06F 13/12
(52) U.S. Cl. ................................. 710/102; 710/2; 710/62; 710/74; 710/129; 74/114
(58) Field of Search .................................... 710/2, 62, 74, 710/129, 102; 711/114

(56) References Cited

U.S. PATENT DOCUMENTS

| | | | |
|---|---|---|---|
| 4,647,123 | * 3/1987 | Chin et al. | 439/61 |
| 5,608,891 | * 3/1997 | Mizuno et al. | 711/114 |
| 5,611,057 | 3/1997 | Pecone et al. | 710/102 |
| 5,628,637 | 5/1997 | Pecone et al. | 439/74 |
| 5,680,555 | 10/1997 | Bodo et al. | 710/126 |
| 5,682,509 | * 10/1997 | Kabenjian | 710/129 |
| 5,737,524 | 4/1998 | Cohen et al. | 710/101 |
| 5,745,795 | 4/1998 | Pecone et al. | 710/62 |
| 5,809,285 | 9/1998 | Hilland | 703/25 |
| 6,061,752 | * 5/2000 | Jones et al. | 710/103 |
| 6,134,630 | * 10/2000 | McDonald et al. | 711/114 |
| 6,188,571 | * 2/2001 | Roganti et al. | 361/685 |

FOREIGN PATENT DOCUMENTS 43 92 143 C1  11/1996  (DE) .

* cited by examiner

*Primary Examiner*—Thomas Lee
*Assistant Examiner*—Tammara Peyton
(74) *Attorney, Agent, or Firm*—Robert E. Bushnell, Esq.

(57) ABSTRACT

A computer system having a hard disk drive and a video display device, includes a RAID card having an interface controller and a RAID controller. A motherboard is constructed with a central processing unit, a system bus, a SCSI controller and edge connectors for the mounting of the RAID card, and when the RAID card is mounted in the edge connectors, the RAID controller is connected to the system bus via the interface controller so that the RAID card inputs and outputs data to and from the CPU. The RAID controller is connected to the hard disk drive through the SCSI controller, thereby providing RAID capabilities for the computer system.

23 Claims, 6 Drawing Sheets

RAID CONTROLLER CARD COUPLED VIA FIRST AND SECOND EDGE CONNECTORS TO THE SYSTEM BUS AND ON-BOARD SCSI CONTROLLER RESPECTFULLY

CLAIM FOR PRIORITY

This application makes reference to, incorporates the same herein, and claims all benefits accruing under 35 U.S.C. §119 from applications for COMPUTER SYSTEM REALIZING RAID USING AN ON-BOARD SCSI earlier filed in the Korean Industrial Property Office on Nov. 24, 1997, and there duly assigned Ser. No. 1997/62324.

BACKGROUND OF THE INVENTION

1. Field of the Invention

The present invention relates to processes and computer systems realizing redundant arrays of inexpensive disks using an on-board small computer system interface, and, more particularly, to computer processes and systems providing the capabilities of redundant arrays of inexpensive disks by using an on-board SCSI controller, and a RAID card that is not equipped with a SCSI controller mounted in an option card slot.

2. Description of the Related Art

Among the many developments computers have undergone over the years, that of increased memory is indisputably one of the most significant. Accordingly, with the vast amount of data that desktop, laptop and notebook type personal computers (e.g., "PCs") can now store and process, reliability of memory has become of utmost importance. Where multiple hard disk drives (i.e., "HDDs") are used to provide the personal computer with a high level of operational and permanent memory, the reliability of the system is in fact reduced, and problems in the management of the hard disk drive, as well as in the writing of data into and the reading of data from the hard disk drive may occur. Reliability can be especially problematic with systems used for applications that require long running times such as computer systems employed in banks, research centers, financial offices, police stations, and other data intensive applications. These problems have received the attention of the industry, generally with efforts to expand the capacity of the computer system, often with adapter and daughter cards such as the Computer System Modular Add-In Daughter Card For An Adapter Card Which Also Functions As An Independent Add-In Card, U.S. Pat. No. 5,611,057, and the Computer System SCSI Adapter Card Including An Add-in Daughter Board Providing An External SCSI ConnectorForModularAnd Upgradable SCSI Bus Routing Options, U.S. Pat. No. 5,628,637, of V. Pecone, et al. Other efforts are represented by the SCSI Connector And Y Cable Configuration Which Selectively Provides Single Or Dual SCSI Channels On A Single Standard SCSI Connector, U.S. Pat. No. 5,745,795 of V. Pecone, et al., the Add-in Board With Programmable Configuration Registers For Use In PCIBus Computers, U.S. Pat. No. 5,737,524 of A. Cohen, et al., and the Host Adapter Providing Automatic Terminator Configuration, U.S. Pat. No. 5,680,555 of M. J. Bode, fail to recognize the problems attendant to the use of multiple hard disk drives. More recent efforts include the Computer System Having A Virtual Drive Array Controller, U.S. Pat. No. 5,809,285 of Jeffrey R. Hilland, have suggested a computer system with a front end coupled to a secondary storage bus and a back end coupled to a plurality of physical memory devices.

Redundant arrays of inexpensive disks (i.e., "RAID") technology have endeavored to address these problems of reliability. Although RAID technology was originally designed to enhance the performance of the input and output (i.e., "I/O") subsystem of personal computers, as this technology progressed it became clear that the main advantages of a RAID system lay in data availability and reliability rather than in performance enhancement. RAID was originally defined by Patterson, Gibson and Kats in a paper entitled *A Case for Redundant Arrays of inexpensive Disks* published by the University of California at Berkeley, during 1987. This paper defined five RAID levels ranging from Level One through Level Five. Subsequently, the personal computer industry has added a sixth level called level Zero, that provides no redundancy features but stripes data across the disks. Five of these six levels, namely levels Zero, One, Three, Four and Five feature prominently in the commercial world. The appropriate RAID level is selected to satisfy the input and output stage requirement of the user.

As customarily implemented, RAID uses a plurality of low-cost disk drives to form an array, and offers substantial performance improvements over the alternative of a single large expensive drive (i.e., "SLED") technology. The mean time between failure is the same as when one disk drive is used because the computer recognizes the array of disks as a single drive. Moreover, RAID is a fault tolerant solution based on software that enables variances in structure according to the intent of the manufacturer and the requirements of the user's computer system. Furthermore, the design of each array controller can be made differently to obtain data availability targets and specific applications.

A hot swap is a technique for replacing (e.g., as by swapping) either the hard disk drive or another auxiliary storage device, by using a single connector attachment (i.e., a "SCA") without turning off the application of electrical power to the computer. With this capability, a RAID can recover during failure of a hard disk drive and data can be automatically recovered without first turning the computer off.

Although redundant arrays of inexpensive disks were formerly used solely in mainframe computers and servers, redundant arrays of inexpensive disks are being increasingly used in personal computers because RAID systems advantageously enable a computer system to be used continuously even when the hard disk drive suddenly malfunctions, and because RAID systems permit an easy replacement of the faulty hard disk drive.

Conventionally, a redundant array of inexpensive disks requires a RAID card that typically bears a SCSI controller, end is mounted on a motherboard. The typical motherboard has an on-board SCSI controller and a SCSI connector, that are mounted on the computer's motherboard. The RAID expansion card must bear in addition to its SCSI controller, a PCI interface controller and a RAID controller, I have found that the overall price of the RAID card is unnecessarily high, that the configuration of the circuit for the computer system is exceptionally complex and difficult to design, and that it is increasingly difficult to manufacture the computer system to conform to industry wide standards such as PCI and EISA.

SUMMARY OF THE INVENTION

It is an object of the present invention to provide an improved redundant array of inexpensive disks.

It is another object to provide an improved process and apparatus for incorporating redundant arrays of inexpensive disks into contemporary computer systems.

It is a further object to provide a process and apparatus that facilitate the integration of a redundant array of inexpensive disks into contemporary computer systems.

It is a still further object to provide a computer system realizing redundant arrays of inexpensive disks using an on-board small computer system interface and a RAID card that is not equipped with a small computer system interface controller.

It is a yet further object to provide a less expensive RAID expansion card.

It is a still yet further object to make a more efficient use of the real estate on the surface of a RAID expansion card.

It is an additional object to provide a RAID expansion card that avoids unnecessary complexity in the configuration of the circuit of a computer system.

It is also an object to provide a RAID expansion card that facilitates the conformance of the computer system to conform to industry wide standards such as PCI and EISA.

These and other objects may be attained in the practice of the present invention with a computer system that establishes a redundant array of inexpensive disks by using a SCSI controller mounted upon a motherboard of the computer system. The computer system, which has a hard disk drive and a video display monitor, includes a RAID card having an interface controller and a RAID controller; and a motherboard including a central processing unit, a system bus, a SCSI controller and an edge connector receivably mounting and electrically coupling the RAID card to the system bus. When the RAID card is mounted in one of the edge connectors, the RAID controller is connected to the system bus via the interface controller; this enables the RAID card to input and output data to and from the central processing unit. The RAID controller is connected to the hard disk drive through the SCSI controller, thereby implementing the capabilities of the redundant array of inexpensive disk concept.

According to one feature that may be implemented in the practice of the present invention, the RAID card is equipped with a first array of edge contacts for the input and output of signals of the interface controller, and a second array forming a expansion edge contacts for the input and output of data between the RAID controller on the RAID card and the SCSI controller on the motherboard.

According to another feature that may be implemented in the practice of the present invention, the motherboard may be fitted with a first edge connector and an expansion edge connector positioned on the motherboard to retentively receive the first array of edge contacts and the expansion array of edge contacts of the RAID card.

BRIEF DESCRIPTION OF THE DRAWINGS

A more complete appreciation ofthe present invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
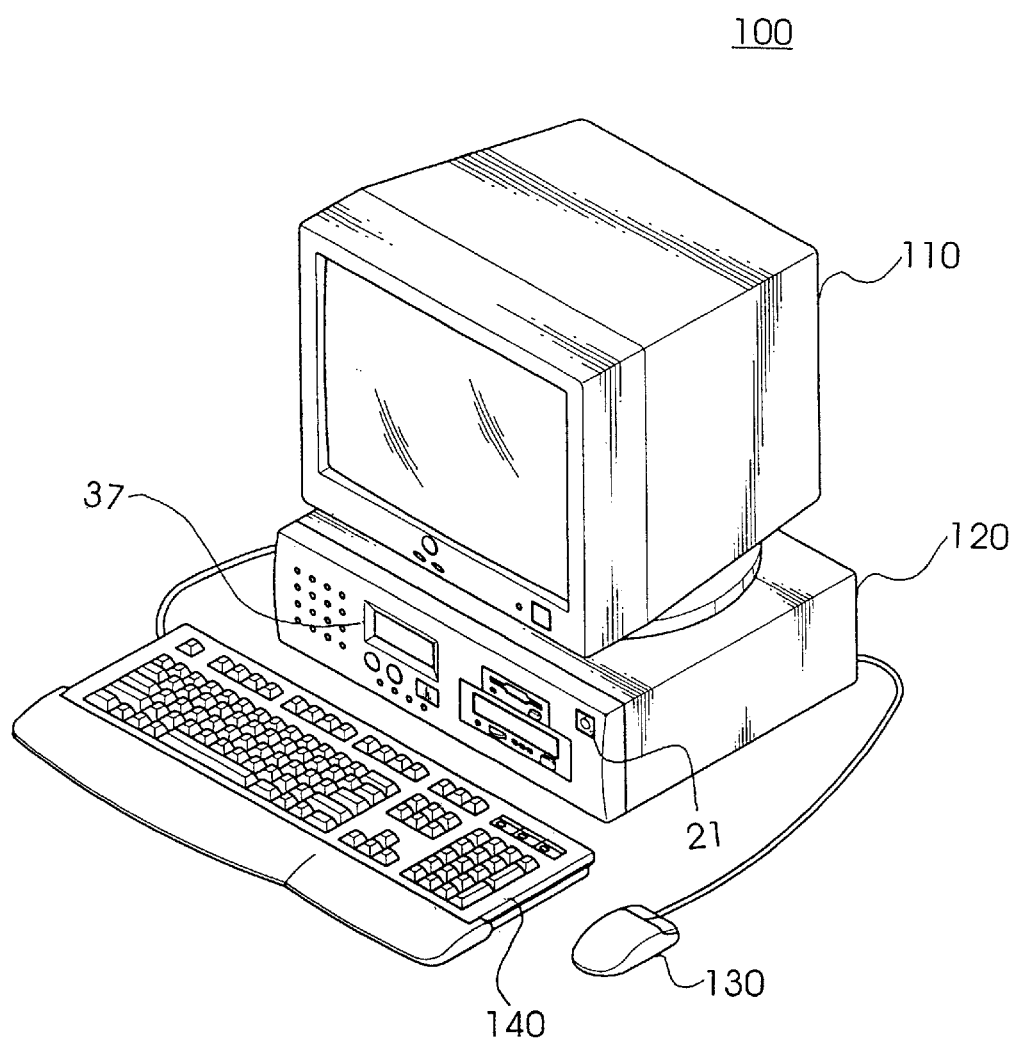
FIG. 1 is a perspective view of a typical desktop type personal computer suitable for the practice of the present invention.

Turning now to the drawings, a representative contemporary implementation of the RAID concept will be described with reference to FIGS. 1, 2 and 3. FIG. 1 is a perspective view of a typical desktop personal computer 100 suitable for the practice of the present invention. Computer system 100 includes a case 120 that serves as the body of the computer, a monitor 110 that provides varying visual images under control of a microprocessor that serves as a central processing unit mounted upon a motherboard enclosed within case 120, a mouse 130 and a keyboard 140 that enable a user to communicate with the microprocessor, a hard disk drive 37 that serves as the operational memory for computer 100, and a power switch 21 that when turned to its off state, interrupts the application of electrical power to computer 100. As shown in FIG. 1, the computer system 100 is turned on or off according to whether a power switch 21 has been manually pressed or not. Power switch 21 is directly connected to a source of electrical power supply. When power switch 21 is turned to the off position, the supply of electrical power is instantly terminated to the central processing unit, memory, hard disk drive 37, and other devices 25.

Figure 2:
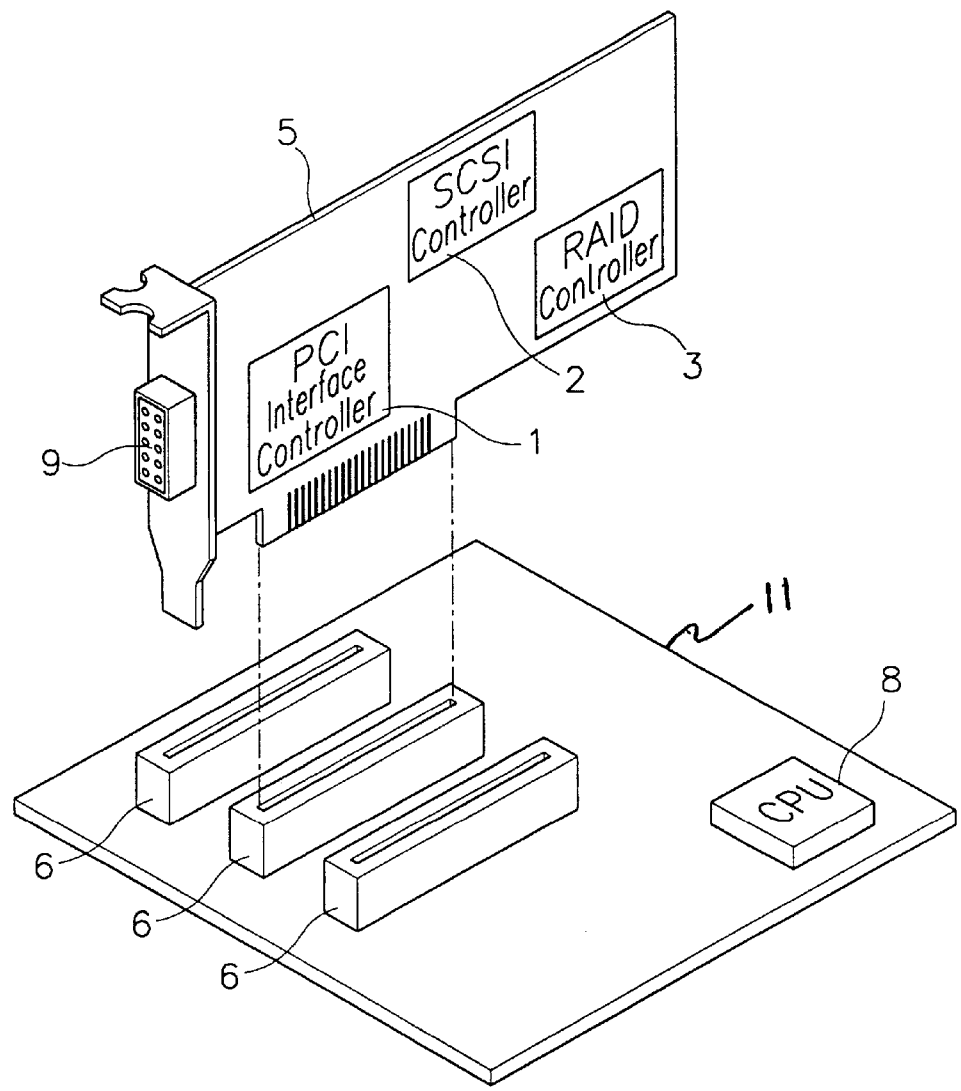
FIG. 2 is a schematic perspective view of an exemplar representation of a RAID card and a motherboard that provides a socket able to mount the RAID card shown.

FIG. 2 shows a schematic perspective view of a RAID card 5 of the type in customary use inside case 120, and a conventional motherboard 11 bearing a row of sockets 6 disposed to accommodate the electrical and mechanical integration of RAID 5 card into the operational system of computer 100. RAID card 5 is mounted on one of several peripheral component interconnect (i.e., a "PCI") edge connector 6 that are surface mounted on computer motherboard 10 as shown by the dotted lines in FIG. 2. All blocks except for the hard disk drive exist on RAID card 5. RAID card 5 is constructed with a PCI interface controller 1, a SCSI controller 2, and a RAID controller 3.

CPU 8 on motherboard 10 outputs control signals through a PCI bus by controlling the PCI interface controller 1 so that RAID functions are executed by RAID controller 3. Also, RAID controller 3 checks for errors in the hard disk drive through SCSI controller 2 and corrects those errors when those errors are detected. Here, although the detection and correction of the errors are performed slightly differently, depending upon the level of RAID established for the particular computer system, an error correcting code that contains redundant information to correct data errors found, or a parity bit technique is typically employed in these processes. Moreover, RAID controller 3 on RAID card 5 additionally controls the hard disk drive to manage the writing and reading of data from the hard disk, and to manage other functions, together with SCSI controller 2.

Figure 3:
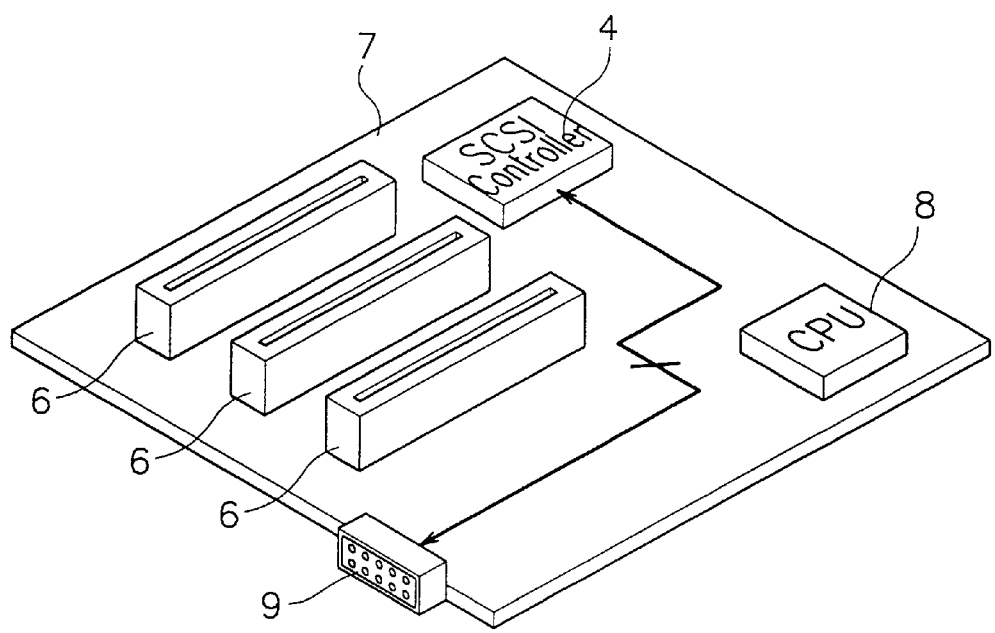
FIG. 3 is a schematic perspective view of a typical motherboard having an on-board SCSI controller.

FIG. 3 shows a schematic perspective view of a motherboard 7 bearing a surface mounted, on-board SCSI controller 4. SCSI controller 4 is operationally coupled to an open pin connector 9 that is also mounted on motherboard 7.

RAID card 5 shown by FIG. 2, with SCSI controller 2 installed on RAID card 5, is mounted on motherboard 7 to establish the redundant array of inexpensive disk functions. It has been my observation that because RAID card 5 must, according to conventional practice, have installed thereon SCSI controller 2, PCI interface controller 1 and RAID controller 3, the overall price of RAID card 5 is unnecessarily increased, the circuit configuration is concomitantly complex, and there are difficulties in achieving conformance to applicable computer industry standards such as PCI and EISA.

Figure 4:
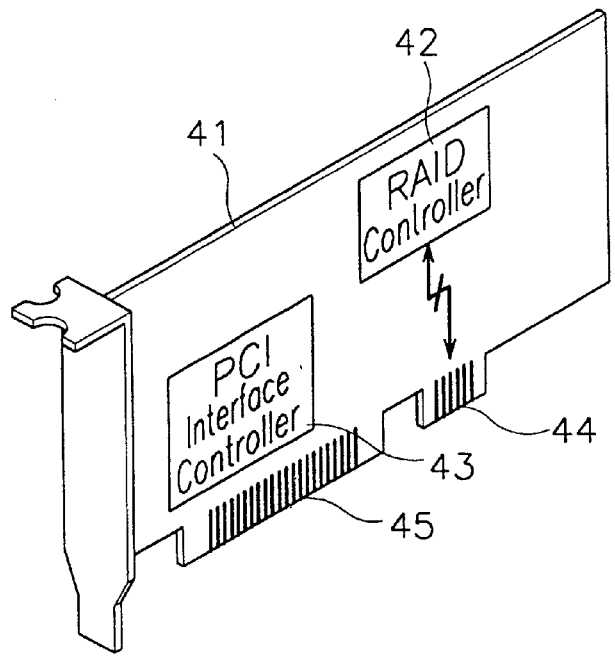
FIG. 4 is a schematic perspective view of a RAID card constructed as a preferred embodiment of the present invention.

Referring first to FIG. 4, the principles ofthe present invention will now be described in detail with reference to the accompanying schematic perspective view of a RAID card 41 constructed according to the principles of the present invention as a preferred embodiment. RAID card 41 is constructed with PCI interface controller 43 and RAID controller 42 surface mounted on one side, and with a first array 45 of edge electrical contacts, and an expansion array 44 of edge electrical contacts plated upon the surfaces of two discrete protrusions of RAID card 41.

Figure 5:
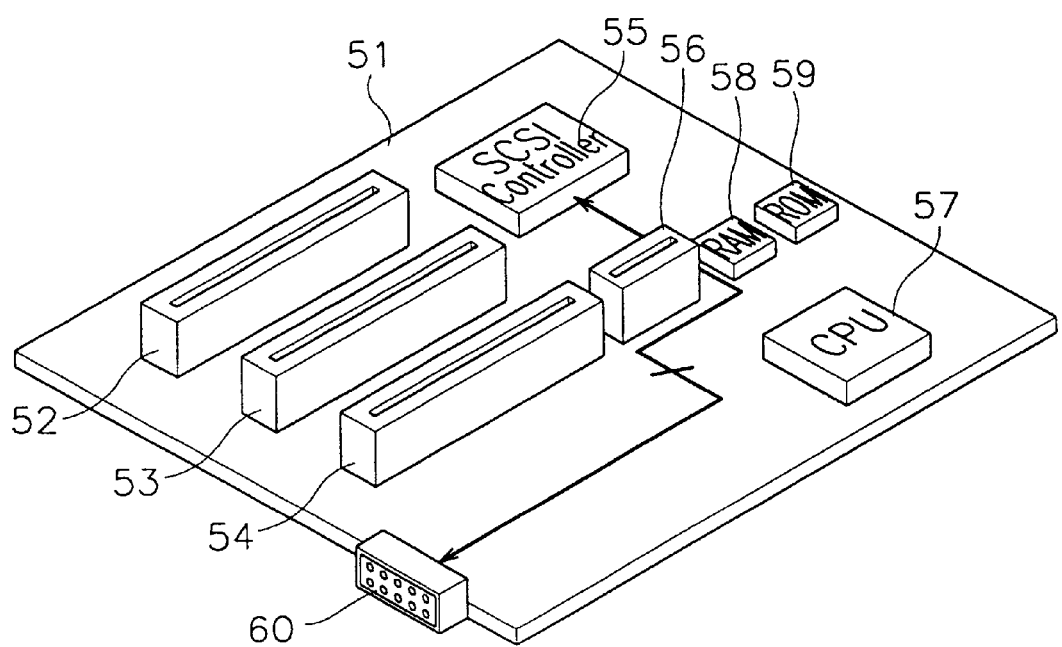
FIG. 5 is a schematic perspective view of a motherboard constructed as a preferred embodiment of the present invention.
Figure 6:
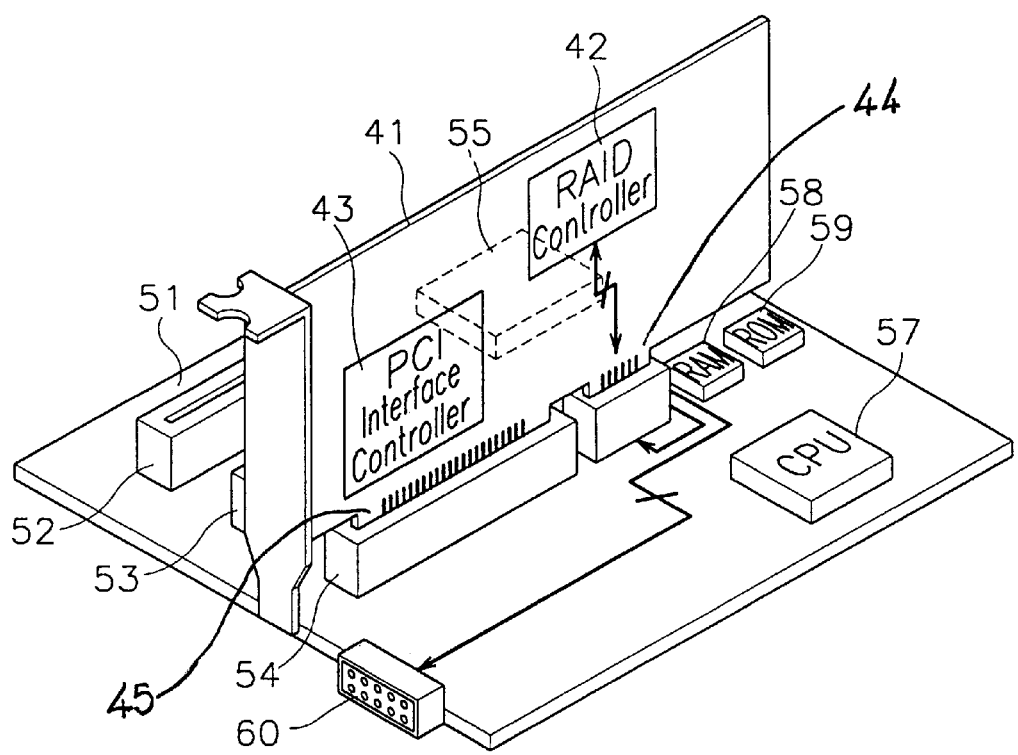
FIG. 6 is a schematic perspective view of the RAID card shown in FIG. 4 mounted in the motherboard shown in FIG. 5.

FIG. 5 shows a schematic perspective view of a motherboard 51 constructed as a preferred embodiment of the present invention. Motherboard 51 is mounted in case 120 of PC 100 as shown in FIG. 1. CPU 57, random access memory (ie., RAM) 58, read only memory (i.e., ROM) 59, SCSI connector 60, SCSI controller 55, RAID card edge connector 54 and RAID card expansion edge connector 56, and edge connectors 52 and 53 are mounted on motherboard 51. As shown in FIG. 6, first edge array 45 and expansion edge array 44 of the RAID card 41 may be retentively received respectively in RAID card edge connector 54 and RAID card expansion edge connector 56 of motherboard 51.

Figure 7:
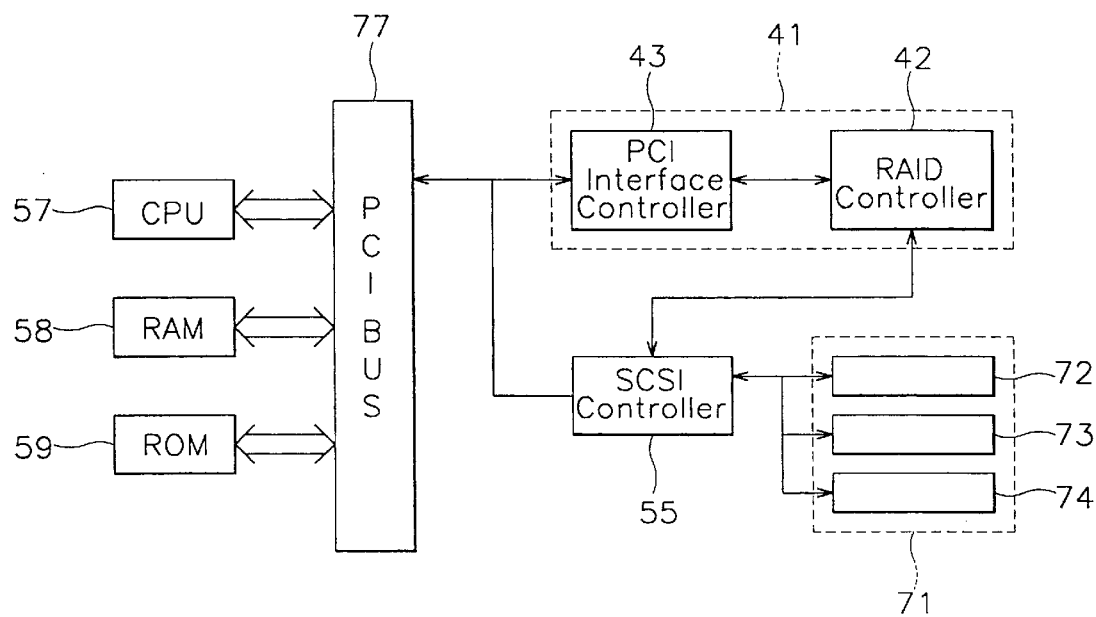
FIG. 7 is a block diagram of a computer system able to provide a redundant array of inexpensive disks using an on-board SCSI controller, constructed as a preferred embodiment according to the principles of the present invention.

FIG. 7 shows a block diagram of a computer system that implements RAID by using an on-board SCSI controller 55, that is, by mounting SCSI controller 55 on the surface of motherboard 51, in accordance with the principles of the present invention. The input and output of signals between SCSI controller 55 and a hard disk drive set 71 formed by a plurality of hard disk drives 72, 73, 74, conforms with the SCSI bus method. Hard disk drive set 71 includes first, second and third hard disk drives 72, 73 and 74. PCI bus 77 operationally interconnects CPU 57, RAM 58 and ROM 59, and RAID card 41 and SCSI controller 55.

The operation of the present invention will now be described with reference to the drawings. First, with RAID card 41 operationally installed in motherboard 51 as shown in FIG. 6, and with computer system 100 of FIG. 1 fully assembled, when electrical power is applied to the computer system, CPU 57 reads the basic input and output code (i.e., the "BIOS") from ROM 59 into RAM 58, and a power on self test (i.e., the "POST") is performed on the computer system by CPU 57. During the POST, if RAID card 41 is mounted on motherboard 51, SCSI controller 55 is disabled so that SCSI controller is unable to independently execute SCSI operations. If RAID card 41 is not mounted in the motherboard 51 however, SCSI controller 55 is enabled and thus performs its normal operational functions.

After the POST operation has been performed, (a) CPU 57 controls RAID controller 42 through PCI bus 77 and PCI interface controller 43, (b) RAID controller 42 controls SCSI controller 55, and (c) a booting program is transmitted to RAM 58 from the hard disk drive set 71. Accordingly, CPU 57 boots the computer system using the booting program loaded in RAM 58 so that the user is able to perform normal computer operations such as word processing and data base manipulation. At this time, while the computer is being used, all data input and output to and from the hard disk drive set 71 is input and output under the control of RAID controller 42 and the SCSI controller 55. Consequently, the speed of data access is increased and the reliability of the computer system is enhanced.

In a computer system constructed according to the principles of the present invention, a RAID card having a RAID controller and a PCI interface controller mounted on the card, is mounted in the RAID card edge and expansion edge connector sockets that are surface mounted on the motherboard. Signals from the RAID controller are transmitted to the on-board SCSI controller through the expansion edge of the RAID card to enable the computer system to realize the capabilities of a redundant array of inexpensive disks. Since an additional SCSI controller need not be included in the RAID card, the cost of manufacturing the RAID card is concomitantly reduced while the real estate on the surface of the RAID card is more efficiently used.

The foregoing paragraphs describe the details of a computer system realizing redundant arrays of inexpensive disk by the use of an on-board small computer system interface. This system enables the capabilities of redundant arrays of inexpensive disks to be realized by using an on-board SCSI controller and a RAID card that is not equipped with a SCSI controller, with the RAID card being mounted in an option card slot. Furthermore, with the application of the present invention to a either a low-end server system that does not require multi-channels, or to a workstation, the capabilities of a redundant arrays of inexpensive disks can be easily obtained.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A computer system having a hard disk drive and a display device, comprising:
   a RAID card having an interface controller and a RAID controller; and
   a motherboard including a CPU, a system bus, a SCSI controller and a plurality of edge connectors for removably mounting of the RAID card, wherein when the RAID card is mounted in the edge connectors, a first of said edge connectors couples the RAID controller to the system bus via the interface controller such that the RAID card inputs and outputs data to and from the CPU, and a second of said edge connectors couples the RAID controller to the hard disk drive through the SCSI controller.

2. The computer system of claim 1, with the RAID card further comprises:
   said first of said edge connector accommodates input and output of signals of the interface controller; and
   said second of said edge connectors comprises an expansion edge connector accommodating input and output of data between the RAID controller of the RAID card and the SCSI controller of the motherboard.

3. The computer system of claim 2, wherein the edge connectors comprise an edge connector and an expansion edge connector into which the edge and the expansion edge of the RAID card are mounted, respectively.

4. The computer system of claim 1, further comprised of said CPU disabling said SCSI controller from independently executing SCSI operations while said RAID card in mounted on said motherboard.

5. The computer system of claim 1, with said first and said second of said plurality of edge connectors comprising an edge connector and an expansion edge connector mounting said RAID card upon said mother board by individually accommodating removable insertion of an edge and an expansion edge of the RAID, respectively.

6. A computer system, comprising:

a hard disk drive;

a display device providing varying video images under control of said computer system;

a RAID card bearing an interface controller and a RAID controller; and a motherboard including a central processing unit, a system bus, a SCSI controller and a plurality of edge connectors accommodating removable mounting of said RAID card on said motherboard to provide operational connection between said motherboard and said RAID card with said RAID controller being connected through a first of said edge connectors to sad system bus via said interface controller to conduct input and output data between said RAID controller and said CPU, and with said RAID controller being separately connected through a second of said edge connectors to said hard disk drive via said SCSI controller to separately provide operational connection between said RAID controller and said hard disk drive through said SCSI controller.

7. The computer system of claim 6, with said first and said second edge connectors respectively comprising an edge connector and an expansion edge connector mounting said RAID card upon said mother board by individually accommodating removable insertion of an edge and an expansion edge of the RAID, respectively.

8. The computer system of claim 6, further comprised of said central processing unit disabling said SCSI controller from independently executing SCSI operations while said RAID card in mounted on said motherboard.

9. The computer system of claim 6, with the RAID card further comprising:

an edge for the input and output of signals of the interface controller; and an expansion edge for the input and output of data between the RAID controller of the RAID card and the SCSI controller of the motherboard.

10. The computer system of claim 9, with said edge connectors comprising an edge connector and an expansion edge connector into which the edge and the expansion edge of the RAID card are mounted, respectively.

11. A computer system, comprising:

a hard disk drive;

a motherboard including a central processing unit, a system bus, a SCSI controller and a plurality of edge connectors;

a RAID card bearing an interface controller and a RAID controller removably plug coupable with said edge connectors to provide temporary mounting of said RAID card on said motherboard while providing operational connection between said motherboard and said RAID card with said RAID controller being connected to said system bus through a first of said edge connectors and with said RAID controller being separately connected to said hard disk drive via said SCSI controller through a second of said edge connectors to separately provide operational connection between said RAID controller and said hard disk drive through said SCSI controller; and a display device illuminating varying video images under control of said central processing unit.

12. The computer system of claim 11, further comprised of said central processing unit disabling said SCSI controller from independently executing SCSI operations while said RAID card in mounted on said motherboard.

13. The computer system of claim 11, with said fist and said second of said edge connectors respectively comprising an edge connector and an expansion edge connector mounting said RAID card upon said mother board by individually accommodating removable insertion of an edge and an expansion edge of the RAID card, respectively, while said RAID controller being connected to said system bus via said interface controller to conduct input and output data between said RAID controller and sad CPU.

14. The computer system of claim 11, with said fist and said second of said edge connectors respectively comprising an edge connector and an expansion edge connector into which an edge and an expansion edge of the RAID card are mounted, respectively via said interface controller to conduct input and output data between said RAID controller and said CPU.

15. The computer system of claim 11, with the RAID card further comprising:

an edge for the input and output of signals of the interface controller; and an expansion edge for the input and output of data between the RAID controller of the RAID card and the SCSI controller of the motherboard.

16. The computer system of claim 15, wherein the edge connectors comprise an edge connector and an expansion edge connector into which the edge and the expansion edge of the RAID card are mounted, respectively.

17. The computer system of claim 13, further comprised of said central processing unit disabling said SCSI controller from independently executing SCSI operations while said RAID card in mounted on said motherboard.

18. The computer system of claim 14, further comprised of said central processing unit disabling said SCSI controller from independently executing SCSI operations while said RAID card in mounted on said motherboard.

19. The computer system of claim 15, further comprised of said central processing unit disabling said SCSI controller from independently executing SCSI operations while said RAID card in mounted on said motherboard.

20. The computer system of claim 16, further comprised of said central processing unit disabling said SCSI controller from independently executing SCSI operations while said RAID card in mounted on said motherboard.

21. A computer system having a hard disk drive and a display device, comprising:
- a RAID card having an interface controller and a RAID controller; and
- a motherboard including a CPU, a system bus, a SCSI controller and a plurality of edge connectors positioned to removably receive mounting of said RAID card;
- a first of said edge connectors coupling said interface controller to said CPU via said system bus and coupling said RAID controller to said system bus via said interface controller; and
- a second of said edge connectors directly coupling said RAID controller to said SCSI controller.

22. The computer system of claim 21, with said second one of said edge connectors comprising an expansion edge of said first one of said edge connectors.

23. The computer system of claim 21, further comprising of said CPU disabling said SCSI controller from independently executing SCSI operations while said RAID card is mounted on said motherboard.

* * * * *